United States Patent
Ho et al.

(10) Patent No.: US 8,952,903 B2
(45) Date of Patent: Feb. 10, 2015

(54) TOUCH DEVICE AND FABRICATION METHOD THEREOF

(75) Inventors: Kwan-Sin Ho, Miaoli (TW); Hao Zhang, Jishou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 390 days.

(21) Appl. No.: 13/205,630

(22) Filed: Aug. 9, 2011

(65) Prior Publication Data

US 2012/0235927 A1  Sep. 20, 2012

(30) Foreign Application Priority Data

Mar. 18, 2011 (CN) .......................... 2011 1 0077947

(51) Int. Cl.
*G06F 3/041* (2006.01)
*G06F 3/044* (2006.01)

(52) U.S. Cl.
CPC ...... *G06F 3/044* (2013.01); *G06F 2203/04107* (2013.01); *G06F 2203/04103* (2013.01)
USPC .......................... 345/173; 345/174; 178/18.01

(58) Field of Classification Search
USPC .................................................. 345/173–179
See application file for complete search history.

(56) References Cited

U.S. PATENT DOCUMENTS

| | | | | |
|---|---|---|---|---|
| 5,579,036 A | * | 11/1996 | Yates, IV ...................... | 345/173 |
| 2007/0257894 A1 | * | 11/2007 | Philipp ......................... | 345/173 |
| 2008/0001926 A1 | * | 1/2008 | XiaoPing et al. ............. | 345/173 |
| 2009/0205879 A1 | * | 8/2009 | Halsey, IV et al. ......... | 178/18.06 |
| 2009/0207151 A1 | | 8/2009 | Liu et al. | |
| 2009/0321149 A1 | * | 12/2009 | Kaltner ...................... | 178/18.06 |

FOREIGN PATENT DOCUMENTS

| | | |
|---|---|---|
| CN | 201174007 Y | 12/2008 |
| CN | 201387599 Y | 1/2010 |
| CN | 201465086 U | 5/2010 |
| TW | M348999 | 1/2009 |
| TW | M361675 | 7/2009 |

* cited by examiner

*Primary Examiner* — Kevin M Nguyen
*Assistant Examiner* — Cory Almeida
(74) *Attorney, Agent, or Firm* — Gokalp Bayramoglu

(57) ABSTRACT

A touch device is provided. The touch device, having a sensing area and a peripheral area, includes a touch-sensing layer, a shielding layer disposed at the peripheral area of and separated from the touch-sensing layer, and an insulating layer disposed between the touch-sensing layer and the shielding layer. Moreover, a fabrication method of a touch device is provided.

25 Claims, 6 Drawing Sheets

TOUCH DEVICE AND FABRICATION METHOD THEREOF

This Application claims the benefit of People's Republic of China Application No. 201110077947.9, filed Mar. 18, 2011.

BACKGROUND OF THE INVENTION

1. Field of the Invention

The present invention relates to a touch device, and in particular, relates to a touch device that has a shielding structure for signal interference and a fabrication method thereof.

2. Description of the Related Art

Recently, touch display panels have been popularly applied in various electronic products, such as a mobile phone, a personal digital assistant (PDA) and a handheld personal computer, in which, the fabrication technologies of capacitive touch display panels have been most popularly used. Touch display panels usually contain a cover lens, a touch panel and a display panel. The cover lens is attached to a touch side of the touch panel and the touch panel is attached to the display panel. Users touch images displayed on the touch display panels with a finger or a touch pen to input signals into the touch display panels or operate the electronic products.

Generally, sensing electrodes of the touch display panel are disposed at a sensing area of the touch panel and signal traces for conveying touch signals, which are disposed at a peripheral area outside of the sensing area and electrically connected to the sensing electrodes. However, when an electronic product containing a touch display panel is held by one hand of a user and operated by another hand of the user, the hand holding the touch display panel and the signal traces at the peripheral area produces an induced capacitance. Accordingly, touch signals produced by the hand touching the sensing area and received by the signal traces are interfered by the induced capacitance. Thus, an erroneous action occurs on the touch display panel, such that the touch operation fails.

BRIEF SUMMARY OF THE INVENTION

According to an illustrative embodiment, a touch device is provided. The touch device can overcome the above-mentioned problems of the conventional touch display panel and avoid the operation of the touch device from being interfered with an induced capacitance produced at a peripheral area.

According to an illustrative embodiment, a touch device having a sensing area and a peripheral area surrounding the sensing area is provided. The touch device comprises a touch-sensing layer, a shielding layer disposed at the peripheral area of and separated from the touch-sensing layer, and an insulating layer disposed between the touch-sensing layer and the shielding layer.

Further, according to an illustrative embodiment, a touch device having a sensing area and a peripheral area surrounding the sensing area is provided. The touch device comprises a substrate having a first surface and a second surface opposite to the first surface, wherein the first surface is a touch side. A sensing electrode is disposed on the second surface of the substrate and a major part of the sensing electrode is disposed at the sensing area. A mask layer is disposed on the second surface of the substrate and at the peripheral area. A signal conveying trace is electrically connected to the sensing electrode and covered by the mask layer. An induced layer is disposed on the mask layer. An insulating layer is disposed between the induced layer and the signal conveying trace as well as between the induced layer and the sensing electrode. A conductive layer is disposed on the induced layer and electrically connected with the induced layer.

According to another illustrative embodiment, a method for fabricating a touch device is provided, wherein the touch device has a sensing area and a peripheral area surrounding the sensing area. The method comprises forming a touch-sensing layer, forming a shielding layer at the peripheral area, wherein the shielding layer is separated from the touch-sensing layer, and forming an insulating layer between the touch-sensing layer and the shielding layer. In particular, the method further comprises providing a substrate having a first surface and a second surface opposite to the first surface, wherein the first surface is a touch side. A mask layer is formed on the second surface of the substrate and at the peripheral area. A sensing electrode is formed on the second surface of the substrate, and a major part of the sensing electrode is formed at the sensing area. An induced layer is formed on the mask layer. An insulating layer is formed on the induced layer. A signal conveying trace is formed on the insulating layer and is electrically connected to the sensing electrode. A conductive layer is formed on the induced layer and electrically connected to the induced layer.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
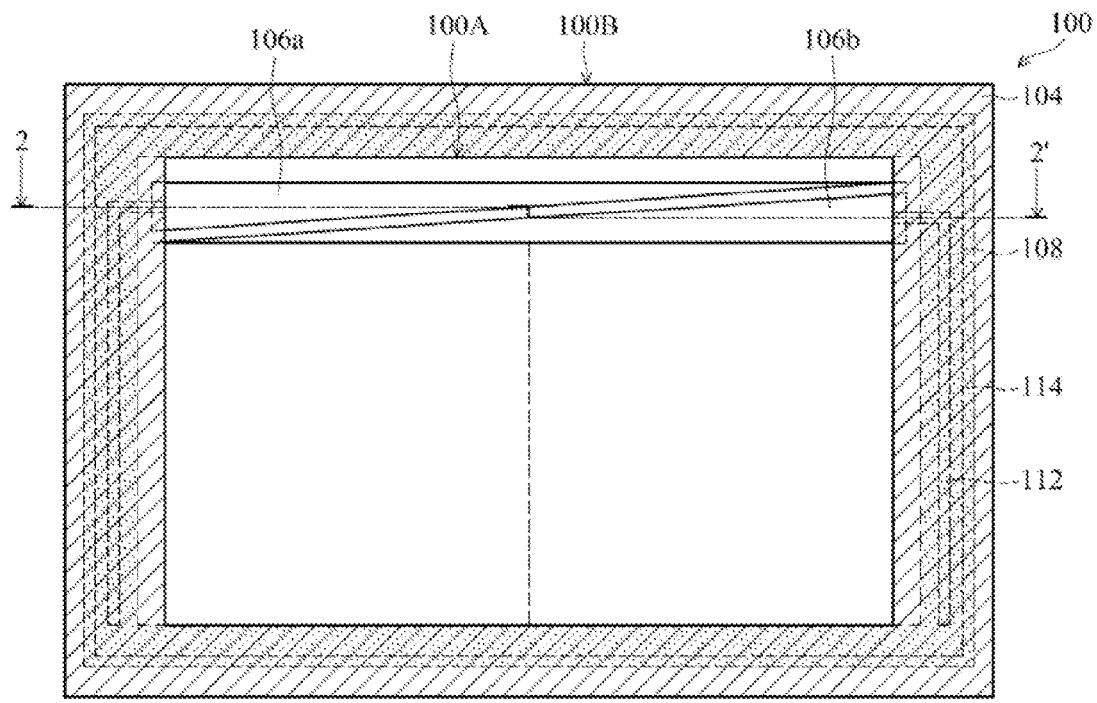
FIG. 1 shows an illustrative plane view of a touch device according to an embodiment of the invention.

Referring to FIG. 1, a plane view of a touch device 100 according to an embodiment of the invention, is shown. The touch device 100 is, for example, a capacitive touch device, having a sensing area 100A and a peripheral area 100B surrounding the sensing area 100A. A plurality of sensing electrodes 106a and 106b are disposed at the sensing area 100A. The sensing electrodes 106a have a first strip-shaped pattern with a gradually decreased width from the left to the right of FIG. 1. The sensing electrodes 106b have a second strip-shaped pattern with a gradually increased width from the left to the right of FIG. 1. The sensing electrodes 106a and 106b are alternately arranged at the sensing area 100A. Signal conveying traces 112 are disposed at the wider sides of the sensing electrodes 106a and 106b. The signal conveying traces 112 are electrically connected with the sensing electrodes 106a and 106b. The electrical variations sensed by the sensing electrodes 106a and 106b are conveyed to a signal processor (not shown) of the touch device 100 through the signal conveying traces 112 for calculating the touch signals. Then, the touch signals are conveyed to a display panel (not shown) of the touch device 100 and images are displayed on the display panel according to the touch signals. The combination of the sensing electrodes 106a and 106b and the signal conveying traces 112 is referred to as a touch-sensing layer.

According to embodiments of the invention, the signal conveying traces 112 are disposed at the peripheral area 100B of the touch device 100. Moreover, as shown in FIG. 1, a mask layer 104 for light shielding, an induced layer 108, and a conductive layer 114 are also disposed at the peripheral area 100B. From a top view, the mask layer 104, the induced layer 108, and the conductive layer 114 have a shape of a ring surrounding the sensing area 100A. In the embodiments of the invention, the induced layer 108 can effectively shield the interference produced from the finger of a user to the signal conveying traces 112 at the peripheral area 100B. A capacitance is first produced between the finger of a user and the induced layer 108. Then, the capacitance is conveyed to a ground terminal through the conductive layer 114 to achieve a shielding effect. Furthermore, conductive material used for the conductive layer 114 can reduce impedance of the induced layer 108, such that the conductive layer 114 can enhance the shielding effect of the induced layer 108. The combination of the induced layer 108 and the conductive layer 114 are referred to as a shielding layer. The shielding layer is disposed at the peripheral area 100B and separated from the above-mentioned touch-sensing layer.

Figure 2:
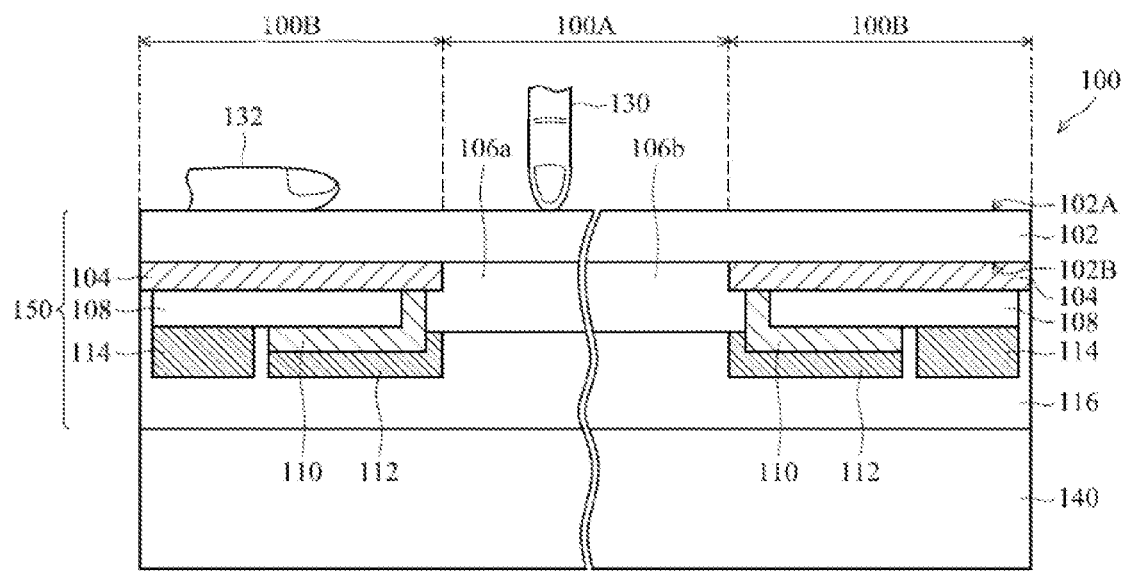
FIG. 2 shows an illustrative cross section of a touch device along the dotted line 2-2' of FIG. 1 according to an embodiment of the invention.

Referring to FIG. 2, an illustrative cross section of a touch device 100 along the dotted line 2-2' of FIG. 1 according to an embodiment of the invention is shown. The touch device 100 includes a touch panel 150 and a display panel 140. The display panel 140 is, for example, a liquid crystal display panel or other display elements. The display panel 140 may be attached under the touch panel 150 through an adhesive layer (not shown).

The touch panel 150 includes a substrate 102, which can be used for a cover lens of the touch panel 150. The substrate 102 may be a transparent or an opaque substrate. When the substrate 102 is a transparent substrate, it can be applied to a touch panel with an image display effect. The material of the transparent substrate is such as a glass substrate. When the substrate 102 is an opaque substrate, it can be applied to a general touch pad. The substrate 102 has a first surface 102A and a second surface 102B which is opposite to the first surface 102A, wherein the first surface 102A is used as a touch side of the touch panel 150. The mask layer 104 is disposed at the peripheral area 100B on the second surface 102B of the substrate 102. The material of the mask layer 104 may be a colored photo-resist or a colored printing ink. The sensing electrodes 106a and 106b are disposed at the sensing area 100A on the second surface 102B of the substrate 102. The materials of the sensing electrodes 106a and 106b may be a transparent conductive material, such as indium tin oxide (ITO). When a finger of a user or a touch pen 130 touches the sensing area 100A of the first surface 102A, an induced capacitance is produced between the finger of the user or the touch pen 130 and the sensing electrodes 106a and 106b.

According to the embodiment of the invention, the induced layer 108 is disposed at the peripheral area 100B, on the second surface 102B of the substrate 102. The materials of the induced layer 108 may be a transparent conductive material, such as indium tin oxide (ITO). The induced layer 108 is formed as a ring structure at the peripheral area 100B and separated from the sensing electrodes 106a and 106b. The signal conveying traces 112 is electrically connected with the sensing electrodes 106a and 106b and covered by the mask layer 104. An insulating layer 110 is disposed between the above-mentioned touch-sensing layer and the shielding layer. In particular, the insulating layer 110 electrically isolates the induced layer 108 from the signal conveying traces 112 and electrically isolates the induced layer 108 from the sensing electrodes 106a and 106b. Moreover, the above-mentioned shielding layer is disposed between the mask layer 104 and the insulating layer 110.

In addition, according to the embodiment of the invention, the conductive layer 114 is disposed on the induced layer 108 and electrically connected with the induced layer 108. The conductive layer 114 is also formed into a ring structure at the peripheral area 100B. The material of the conductive layer 114 may be a metal material. Since the transparent conductive material used for the induced layer 108 has high impedance, using the conductive layer 114 to electrically connect with the induced layer 108 can reduce the impedance of the induced layer 108 and enhance the shielding effect of the induced layer 108. Furthermore, a passivation layer 116 is blanketly formed on the second surface 102B of the substrate 102 to cover all components on the second surface 102B of the substrate 102, including the sensing electrodes 106a and 106b, the signal conveying traces 112, the induced layer 108, the conductive layer 114, and the mask layer 104. The material of the passivation layer 116 may be an organic or an inorganic material. The display panel 140 is provided under the touch panel 150 for bonding with the passivation layer 116 to form the touch device 100.

As shown in FIG. 2, when one hand 132 of a user holds the touch device 100, the hand 132 of the user and the induced layer 108 produce capacitance. Then, the produced capacitance is conveyed to a ground terminal through the conductive layer 114. Therefore, the induced layer 108 effectively shields the interference produced from the hand 132 of the user to the signal conveying traces 112 at the peripheral area 100B.

Figure 3A:
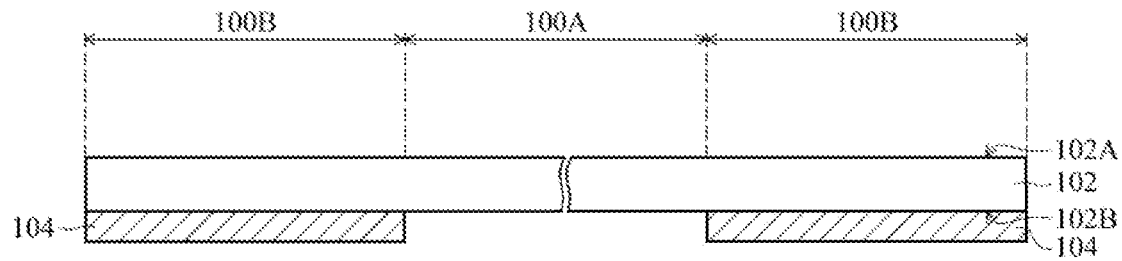
FIGS. 3A-3D show illustrative cross sections of intermediate stages for fabricating the touch panel of FIG. 2 according to an embodiment of the invention.

Next, referring to FIGS. 3A-3D, illustrative cross sections of intermediate stages for fabricating the touch panel 150 of FIG. 2 according to an embodiment of the invention are shown. First, as shown in FIG. 3A, a substrate 102 is provided, having a first surface 102A and an opposite second surface 102B. The first surface 102A is used as a touch side of the touch panel 150. A mask layer 104 is formed at the peripheral area 100B on the second surface 102B of the substrate 102. The material of the mask layer 104 is, for example, a colored photo-resist or a colored printing ink, which can be patterned by a photolithography or a printing process to form the mask layer 104.

Figure 3B:
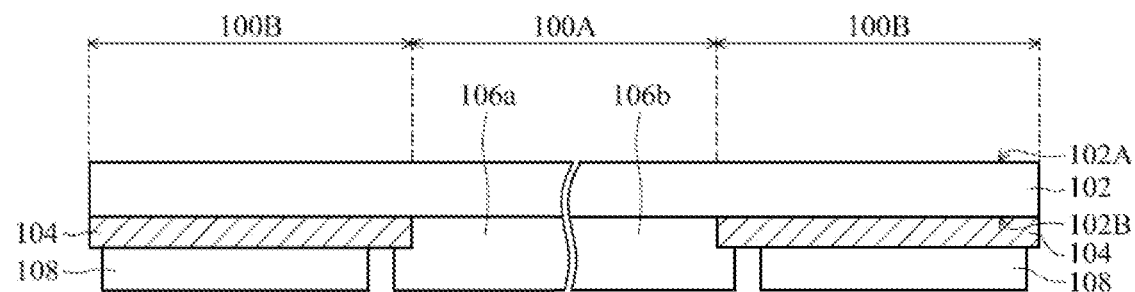

As shown in FIG. 3B, a transparent conductive material layer is blanketly formed on the second surface 102B of the substrate 102. Then, the transparent conductive material layer is patterned by a photolithography and etching process or a printing process to form the sensing electrodes 106a and 106b at the sensing area 100A on the second surface 102B of the substrate 102 and form the induced layer 108 on the mask layer 104 at the peripheral area 100B. The sensing electrodes 106a and 106b are separated from the induced layer 108. In an embodiment, the same process can form the sensing electrodes 106a and 106b and the induced layer 108 simultaneously. In another embodiment, different processes can form the sensing electrodes 106a and 106b and the induced layer 108 separately.

Figure 3C:
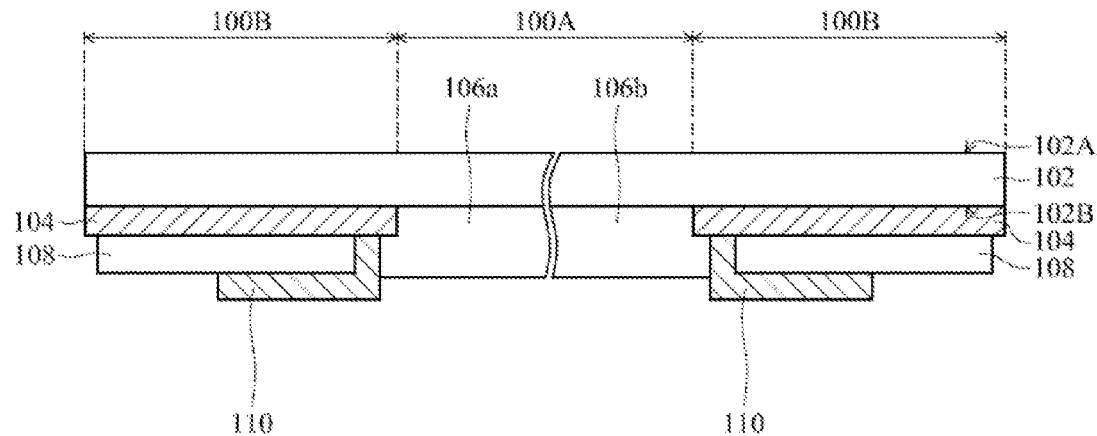

As shown in FIG. 3C, the insulating layer 110 is formed on the induced layer 108 and extends to a space between the sensing electrodes 106a and 106b and the induced layer 108. The material of the insulating layer 110 may be an organic or an inorganic insulating material, such as polyimide, which can be patterned by a photolithography or a printing process to form the insulating layer 110.

Figure 3D:
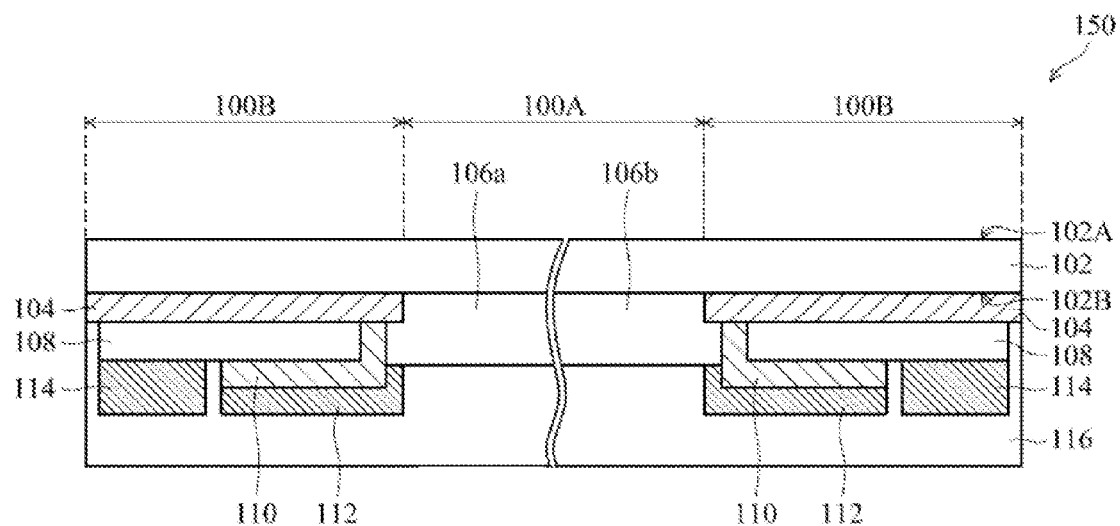

Next, as shown in FIG. 3D, the signal conveying traces 112 is formed on the insulating layer 110 and electrically connected to the sensing electrodes 106a and 106b. In addition, the conductive layer 114 is formed on the induced layer 108 and electrically connected with the induced layer 108. The materials of the signal conveying traces 112 and the conductive layer 114 may be a metal material, which can be patterned by a photolithography and etching process or a printing process to form the signal conveying traces 112 and the conductive layer 114. In an embodiment, the signal conveying traces 112 and the conductive layer 114 can be formed simultaneously by the same process. In another embodiment, the signal conveying traces 112 and the conductive layer 114 can be formed separately by different processes.

Then, the passivation layer 116 is blanketly formed over the second surface 102B of the substrate 102 to cover all components on the second surface 102B, including the sensing electrodes 106a and 106b, the signal conveying traces 112, the induced layer 108, the conductive layer 114, and the mask layer 104 to complete the fabrication of the touch panel 150.

Figure 4:
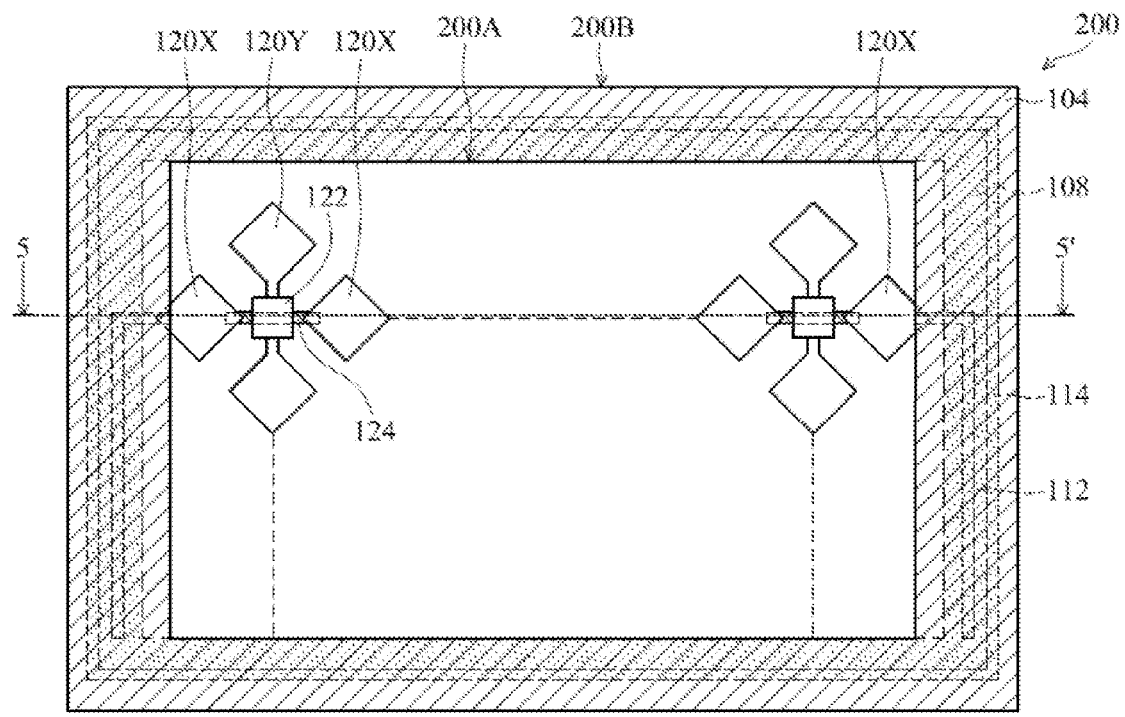
FIG. 4 shows an illustrative plane view of a touch device according to another embodiment of the invention.

Referring to FIG. 4, an illustrative plane view of a touch device 200 according to another embodiment of the invention is shown. The touch device 200 is, for example, a capacitive touch device, having a sensing area 200A and a peripheral area 200B surrounding the sensing area 200A. A plurality of first sensing electrodes 120Y arranged in columns and a plurality of second sensing electrodes 120X arranged in rows are disposed at the sensing area 200A. The first sensing electrodes 120Y arranged in a same column are connected with each other. The second sensing electrodes 120X arranged in a same row are separated from each other. Any two adjacent second sensing electrodes 120X arranged in a same row are connected together by a bridging line 124. Moreover, an isolation portion 122 is disposed between the first sensing electrode 120Y and the bridging line 124 for electrically isolating the first sensing electrodes 120Y from the second sensing electrodes 120X. The electrical variations sensed by the second sensing electrodes 120X arranged in rows are conveyed to a signal processor (not shown) of the touch device 200 through the signal conveying traces 112 for calculating touch signals. Then, the touch signals are conveyed to a display panel (not shown) of the touch device 200 through the signal conveying traces 112 for displaying images on the display panel according to the touch signals. Although it is not shown in FIG. 4, one skilled in the art can understand that the electrical variations sensed by the first sensing electrodes 120Y arranged in columns, can also be conveyed through other signal conveying traces (not shown). The combination of the first sensing electrodes 120Y, the second sensing electrodes 120X, the bridging line 124, and the signal conveying traces 112 is referred to as a touch-sensing layer.

According to the embodiment of the invention, the signal conveying traces 112 are disposed at the peripheral area 200B of the touch device 200. Moreover, as shown in FIG. 4, a mask layer 104 for light shielding, an induced layer 108, and a conductive layer 114 are also disposed at the peripheral area 200B. From a top view, the mask layer 104, the induced layer 108, and the conductive layer 114 have the shape of a ring surrounding the sensing area 200A. In the embodiments of the invention, the induced layer 108 can effectively shield the interference produced from the fingers of a user to the signal conveying traces 112 at the peripheral area 200B. A capacitance is first produced between the fingers of a user and the induced layer 108. Then, the capacitance is conveyed to a ground terminal through the conductive layer 114 to achieve a shielding effect. Furthermore, the conductive material used for the conductive layer 114 can reduce impedance of the induced layer 108, such that the shielding effect of the induced layer 108 is enhanced. The combination of the induced layer 108 and the conductive layer 114 is referred to as a shielding layer. The shielding layer is disposed at the peripheral area 200B and separated from the above-mentioned touch-sensing layer.

Figure 5:
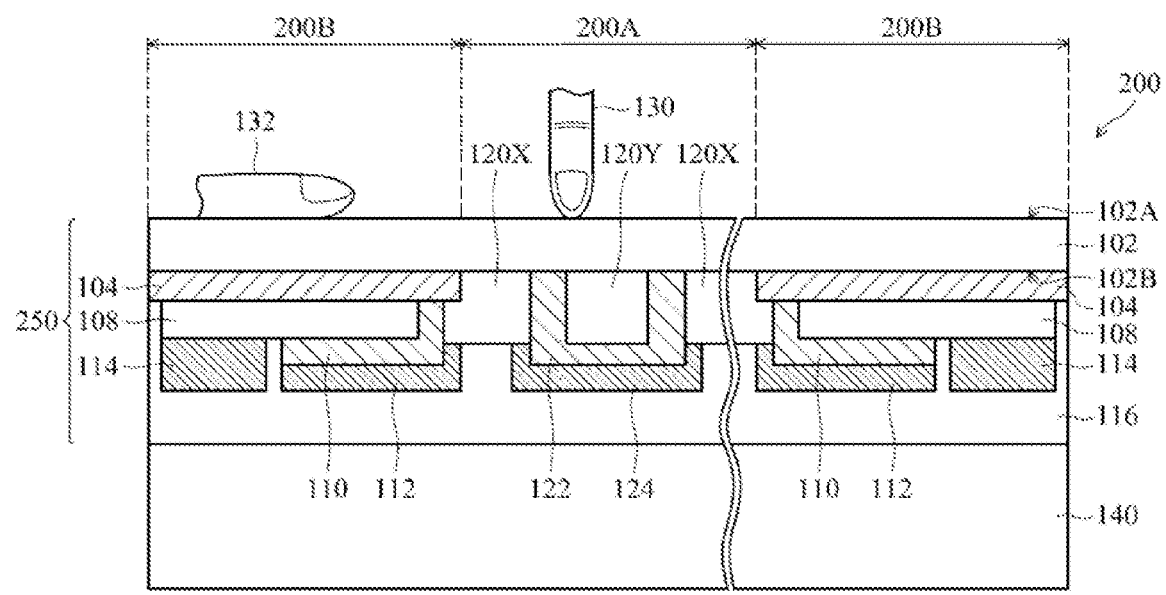
FIG. 5 shows an illustrative cross section of a touch device along the dotted line 5-5' of FIG. 4 according to an embodiment of the invention.

Referring to FIG. 5, an illustrative cross section of a touch device 200 along the dotted line 5-5' of FIG. 4 according to an embodiment of the invention, is shown. The touch device 200 includes a touch panel 250 and a display panel 140. The display panel 140 is, for example, a liquid crystal display panel or other display elements and attached under the touch panel 250. The touch panel 250 includes a substrate 102. The substrate 102 may be a transparent or an opaque substrate, which can be used for a cover lens of the touch panel 250. When the substrate 102 is a transparent substrate, it can be applied to a touch panel having image display effect. The material of the transparent substrate is such as a glass plate. When the substrate 102 is an opaque substrate, it can be applied to a general touch pad. The substrate 102 has a first surface 102A and an opposite second surface 102B, wherein the first surface 102A is used as a touch side of the touch panel 250. A mask layer 104 is disposed at the peripheral area 200B on the second surface 102B of the substrate 102. The material of the mask layer 104 may be a colored photo-resist or a colored printing ink. A plurality of first sensing electrodes 120Y and a plurality of second sensing electrodes 120X are disposed at the sensing area 200A on the second surface 102B of the substrate 102. The materials of the first sensing electrodes 120Y and the second sensing electrodes 120X may be a transparent conductive material, such as indium tin oxide (ITO). When a finger of a user or a touch pen 130 touches the sensing area 200A of the first surface 102A, an induced capacitance is produced between the finger of the user or the touch pen 130 and the first sensing electrodes 120Y and the second sensing electrodes 120X.

According to the embodiment of the invention, an insulating layer 110 is disposed between the above-mentioned touch-sensing layer and the shielding layer. The above-mentioned shielding layer is disposed between the mask layer 104 and the insulating layer 110. The induced layer 108 is disposed on the mask layer 104. The materials of the induced layer 108 may be a transparent conductive material, such as indium tin oxide (ITO). The induced layer 108 is formed as a ring structure at the peripheral area 200B and separated from the first sensing electrodes 120Y and the second sensing electrodes 120X. The insulating layer 110 is disposed on the induced layer 108 for electrically isolating the induced layer 108 from subsequently formed signal conveying traces 112. The insulating layer 110 further extends to a space between the induced layer 108 and the second sensing electrode 120X. Moreover, an isolation portion 122 is disposed on the first sensing electrode 120Y for electrically isolating the first sensing electrode 120Y from a subsequently formed bridging line 124 which connects to the second sensing electrodes 120X. Then, the signal conveying traces 112 is disposed on the insulating layer 110 and electrically connects to the second sensing electrode 120X. The bridging line 124 is disposed on the isolation portion 122 and electrically connects any two adjacent second sensing electrodes 120X together in the same row.

In addition, according to the embodiment of the invention, the conductive layer 114 is disposed on the induced layer 108. The material of the conductive layer 114 may be a metal material. Because the transparent conductive material used for the induced layer 108 has high impedance, using the conductive layer 114 to electrically connect with the induced layer 108 can reduce the impedance of the induced layer 108 and enhance the shielding effect of the induced layer 108. As shown in FIG. 5, when one hand 132 of a user holds the touch device 200, the hand 132 of the user and the induced layer 108 produces capacitance. Then, the produced capacitance is conveyed to a ground terminal through the conductive layer 114. Thus, the induced layer 108 effectively shields the interference produced from the hand 132 of a user to the signal conveying traces 112 at the peripheral area 200B.

Finally, a passivation layer 116 is blanketly formed on the second surface 102B of the substrate 102 to cover all components on the second surface 102B, including the first sensing electrodes 120Y, the second sensing electrodes 120X, the signal conveying traces 112, the bridging line 124, the induced layer 108, the conductive layer 114, and the mask layer 104. The display panel 140 is provided under the touch panel 250 for bonding with the passivation layer 116, for example attached under the passivation layer 116 through an adhesive layer (not shown) to complete the touch device 200.

Figure 6A:
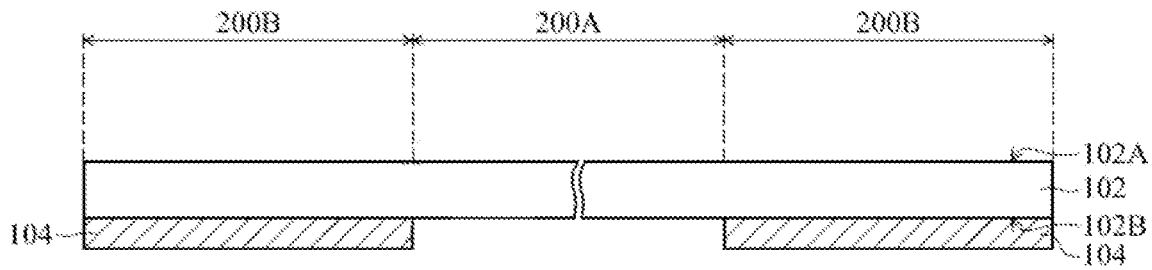
FIGS. 6A-6D show illustrative cross sections of intermediate stages for fabricating the touch panel of FIG. 5 according to an embodiment of the invention.

Next, referring to FIGS. 6A-6D, illustrative cross sections of intermediate stages for fabricating the touch panel 250 of FIG. 5 according to an embodiment of the invention are shown. First, as shown in FIG. 6A, a substrate 102 is provided. The substrate 102 has a first surface 102A and an opposite second surface 102B, wherein the first surface 102A is used as a touch side of the touch panel 250. A mask layer 104 is formed at the peripheral area 200B on the second surface 102B of the substrate 102. The material of the mask layer 104 is for example a colored photo-resist or a colored printing ink, which can be patterned by a photolithography or a printing process to form the mask layer 104.

Figure 6B:
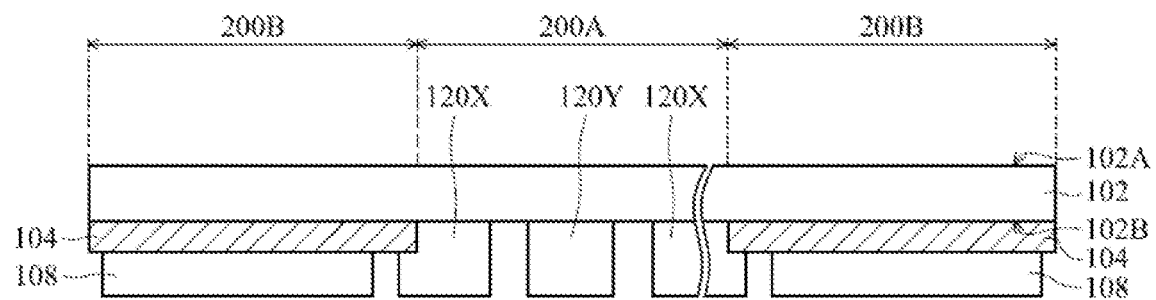

As shown in FIG. 6B, a transparent conductive material layer is blanketly formed on the second surface 102B of the substrate 102. Then, the transparent conductive material layer is patterned by a photolithography and etching process or a printing process to form the first sensing electrodes 120Y and the second sensing electrodes 120X at the sensing area 200A and form the induced layer 108 on the mask layer 104 at the peripheral area 200B. The first sensing electrodes 120Y and the second sensing electrodes 120X are separated from the induced layer 108. In an embodiment, the same process can form the first sensing electrodes 120Y and the second sensing electrodes 120X and the induced layer 108 simultaneously. In another embodiment, different processes can form the first sensing electrodes 120Y and the second sensing electrodes 120X and the induced layer 108 separately.

Figure 6C:
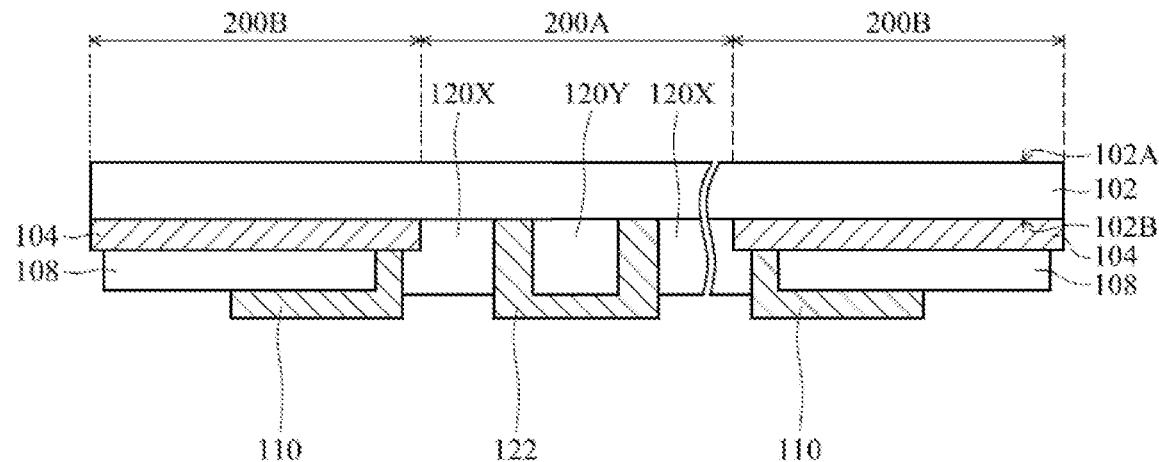

As shown in FIG. 6C, the insulating layer 110 is formed on the induced layer 108 and extends to a space between the second sensing electrodes 120X and the induced layer 108. Moreover, the isolation portion 122 is formed on the first sensing electrode 120Y and extends to a space between the first sensing electrode 120Y and the second sensing electrode 120X. The material of the insulating layer 110 and the isolation portion 122 may be an organic or an inorganic insulating material, such as polyimide, which can be patterned by a photolithography or a printing process to form the insulating layer 110 and the isolation portion 122. In an embodiment, the same process may form the insulating layer 110 and the isolation portion 122 simultaneously. In another embodiment, different processes may form the insulating layer 110 and the isolation portion 122 separately.

Figure 6D:
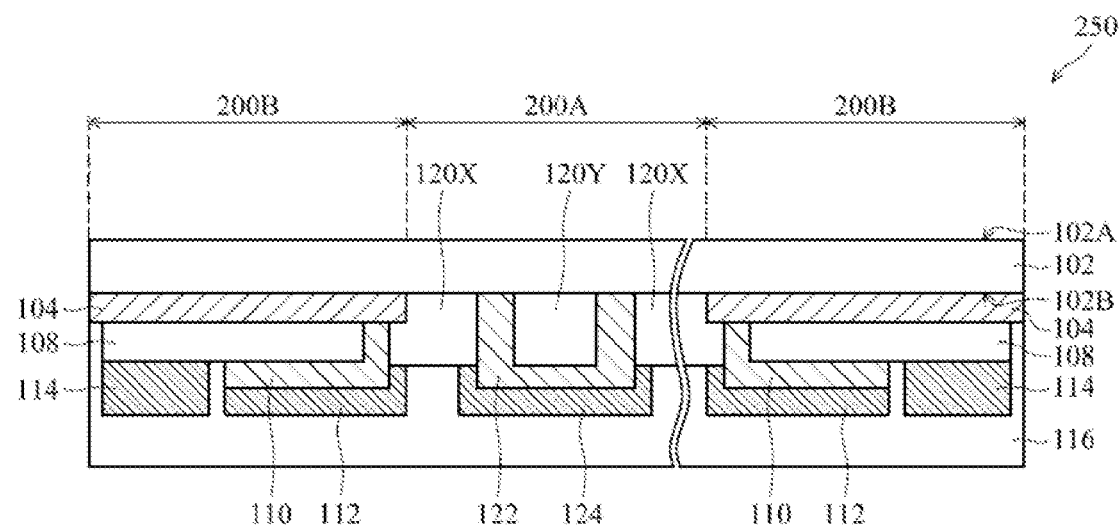

Next, as shown in FIG. 6D, the signal conveying traces 112 are formed on the insulating layer 110 and electrically connected to the second sensing electrode 120X. The bridging line 124 is formed on the isolation portion 122. Each bridging line 124 electrically connects any two adjacent second sensing electrodes 120X together in the same row. Moreover, the conductive layer 114 is formed on the induced layer 108 and electrically connects with the induced layer 108. The materials of the signal conveying traces 112, the bridging line 124, and the conductive layer 114 may be a metal material, which can be patterned by a photolithography and etching process to form the signal conveying traces 112, the bridging line 124, and the conductive layer 114. In an embodiment, the same process can form the signal conveying traces 112, the bridging line 124, and the conductive layer 114 simultaneously. In another embodiment, different processes can form the signal conveying traces 112, the bridging line 124, and the conductive layer 114 separately.

Finally, the passivation layer 116 is blanketly formed over the second surface 102B of the substrate 102 to cover all components on the second surface 102B, including the first sensing electrodes 120Y, the second sensing electrodes 120X, the signal conveying traces 112, the bridging line 124, the induced layer 108, the conductive layer 114, and the mask layer 104 to complete the fabrication of the touch panel 250.

According to the embodiments of the invention, the induced layer 108 in the touch panels 150 and 250 can effectively shield the interference in the signal conveying traces 112 at the peripheral areas 100B and 200B, respectively. Moreover, the conductive layer 114 electrically connecting to the induced layer 108 can reduce the impedance of the induced layer 108 to enhance the shielding effect of the induced layer 108. Accordingly, through the combination of the induced layer 108 and the conductive layer 114, the interference in the signal conveying traces 112 at the peripheral areas 100B and 200B can be shielded more effectively.

Moreover, in the touch panel 150 of the embodiment of the invention, the same process can form the induced layer 108 at the peripheral area 100B and the sensing electrodes 106a and 106b at the sensing area 100A simultaneously. The same process also can form the conductive layer 114 and the signal conveying traces 112 simultaneously. Therefore, compared with the processes for fabricating the conventional touch panels, the touch panel 150 of the embodiment of the invention only requires one added process step of forming the insulating layer 110 to complete the fabrication of the touch panel 150 and achieve an excellent shielding effect at the same time.

Furthermore, in the touch panel 250 of the embodiment of the invention, the induced layer 108 at the peripheral area 200B and the first sensing electrodes 120Y and the second sensing electrodes 120X at the sensing area 200A can be formed simultaneously by the same process. The same process also can form the conductive layer 114, the signal conveying traces 112, and the bridging line 124 simultaneously. The same process also can form the insulating layer 110 and the isolation portion 122 at the sensing area 200A simultaneously. Therefore, compared with the processes for fabricating the conventional touch panels, the touch panel 250 of the embodiment of the invention does not require any extra process step to complete the fabrication of the touch panel 250 and achieve excellent shielding effect at the same time.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch device, having a sensing area and a peripheral area surrounding the sensing area, the touch device comprising:
    a substrate;
    a touch-sensing layer disposed on a bottom surface of the substrate, wherein the touch-sensing layer comprises at least one sensing electrode and at least one signal conveying trace, a major part of the sensing electrode is disposed at the sensing area, and the signal conveying trace is electrically insulated from the shielding layer by the insulating layer, and a major part of the signal conveying trace is disposed at the peripheral area, and the signal conveying trace is electrically connected with the sensing electrode;
    a shielding layer disposed on the bottom surface of the substrate and substantially formed at the peripheral area, wherein the shielding layer has a shape surrounding the touch-sensing layer; and
    an insulating layer disposed on the bottom surface of the substrate and between the touch-sensing layer and the shielding layer, wherein the shielding layer comprises an induced layer and a conductive layer, a gap is defined between a side portion of the induced layer and a side portion of the sensing electrode, the insulating layer is filled into the gap and covers a portion of a bottom surface of the induced layer, and the conductive layer is disposed on an uncovered portion of the bottom surface of the induced layer to electrically connect with the induced layer.

2. The touch device of claim 1, further comprising a mask layer, wherein the mask layer is disposed on the bottom surface of the substrate and at the peripheral area.

3. The touch device of claim 2, wherein the shielding layer is substantially covered by the mask layer, and the shielding layer and the mask layer are formed into a ring shape surrounding the touch-sensing layer.

4. A touch device, having a sensing area and a peripheral area surrounding the sensing area, the touch device comprising:
    a substrate:
    a sensing electrode disposed on a bottom surface of the substrate and at the sensing area;
    a mask layer disposed on the bottom surface of the substrate and at the peripheral area;
    a signal conveying trace electrically connected to the sensing electrode and covered by the mask layer;
    a shielding layer disposed on the bottom surface of the substrate and substantially formed at the peripheral area, wherein the shielding layer has a shape surrounding the touch-sensing layer, and the shielding layer comprises an induced layer and a conductive layer; wherein the induced layer is covered by the mask layer, and the conductive layer is electrically connected with the induced layer; and
    an insulating layer disposed on the bottom surface of the substrate, wherein the insulating layer is located between the induced layer and the signal conveying trace and between the induced layer and the sensing electrode, wherein a gap is defined between a side portion of the induced layer and a side portion of the sensing electrode, the insulating layer is filled into the gap and covers a portion of a bottom surface of the induced layer, and the conductive layer is disposed on a uncovered portion of the bottom surface of the induced layer to electrically connect with the induced layer.

5. The touch device of claim 4, wherein the sensing electrode comprises a plurality of first strip-shaped patterns having a gradually decreased width and a plurality of second strip-shaped patterns having a gradually increased width, and the first strip-shaped patterns and the second strip-shaped patterns are alternately arranged.

6. The touch device of claim 4, wherein the sensing electrode comprises a plurality of first sensing electrodes arranged in columns and a plurality of second sensing electrodes arranged in rows, and the first sensing electrodes are connected with each other and the second sensing electrodes are separated from each other.

7. The touch device of claim 6, further comprising:
    a bridging line electrically connecting any two adjacent second sensing electrodes together; and
    an isolation portion disposed between the first sensing electrode and the bridging line.

8. The touch device of claim 4, wherein the sensing electrode and the induced layer are made of the same material comprising a transparent conductive material.

9. The touch device of claim 4, wherein the signal conveying trace and the conductive layer are made of the same material comprising a metal material, and the signal conveying trace is electrically insulated from the conductive layer.

10. The touch device of claim 4, wherein the shapes of the mask layer, the induced layer and the conductive layer comprise a ring surrounding the sensing electrode.

11. The touch device of claim 4, further comprising:
    a passivation layer entirely disposed over the substrate, covering the sensing electrode, the mask layer, the signal conveying trace, the induced layer, and the conductive layer; and
    a display panel bonded with the passivation layer.

12. A method for fabricating a touch device, wherein the touch device has a sensing area and a peripheral area surrounding the sensing area, comprising:
    forming a touch-sensing layer on a bottom surface of a substrate, wherein the touch-sensing layer comprises at least one sensing electrode and at least one signal conveying trace;
    forming a shielding layer on the bottom surface of the substrate and substantially at the peripheral area, wherein the shielding layer has a shape surrounding the touch-sensing layer and is separated from the touch-sensing layer; and
    forming an insulating layer on the bottom surface of the substrate and between the touch-sensing layer and the shielding layer, wherein the shielding layer comprises an induced layer and a conductive layer, a gap is defined between a side portion of the induced layer and a side portion of the sensing electrode, the insulating layer is filled into the gap and covers a portion of a bottom surface of the induced layer, and the conductive layer is disposed on a uncovered portion of the bottom surface of the induced layer to electrically connect with the induced layer.

13. The method of claim 12, wherein in the step of forming a touch-sensing layer, a major part of the sensing electrode is formed at the sensing area, and the signal conveying trace is electrically insulated from the shielding layer by the insulating layer, and a major part of the signal conveying trace is formed at the peripheral area, and the signal conveying trace is electrically connected with the sensing electrode.

14. The method of claim 13, wherein the step of forming the sensing electrode comprises forming a plurality of first strip-shaped patterns with a gradually decreased width and forming a plurality of second strip-shaped patterns with a gradually increased width, and the first strip-shaped patterns and the second strip-shaped patterns are alternately arranged.

15. The method of claim 12, further comprising a forming process simultaneously forming the sensing electrode and the induced layer.

16. The method of claim 12, wherein the sensing electrode and the induced layer are made of the same material comprising a transparent conductive material, and the signal conveying trace is electrically insulated from the conductive layer.

17. The method of claim 12, further comprising a forming process simultaneously forming the signal conveying trace and the conductive layer.

18. The method of claim 12, wherein the signal conveying trace and the conductive layer are made of the same material comprising a metal material.

19. The method of claim 12, wherein the insulating layer is formed between the induced layer and the sensing electrode and between the induced layer and the signal conveying trace.

20. The method of claim 12, wherein the step of forming the sensing electrode comprises:
    forming a plurality of first sensing electrodes arranged in columns and forming a plurality of second sensing electrodes arranged in rows, wherein the first sensing electrodes are connected with each other and the second sensing electrodes are separated from each other;
    forming a bridging line to electrically connect any two adjacent second sensing electrodes in a same row together; and
    forming an isolation portion between the first sensing electrode and the bridging line.

21. The method of claim 20, wherein the bridging line, the signal conveying trace and the conductive layer are simultaneously formed by a same process.

22. The method of claim 20, wherein the isolation portion and the insulating layer are simultaneously formed by a same process.

23. The method of claim 12, further comprising:
    forming a mask layer on the bottom surface of the substrate, wherein the mask layer is formed at the peripheral area.

24. The method of claim 23, wherein the shielding layer is substantially covered by the mask layer, and the shielding layer and the mask layer are formed into a ring shape surrounding the touch-sensing layer.

25. The method of claim 12, further comprising:
    blanketly forming a passivation layer to cover the touch-sensing layer and the shielding layer; and
    providing a display panel to bond with the passivation layer.

* * * * *